United States Patent

Kroos

[15] 3,686,512

[45] Aug. 22, 1972

[54] LOGIC CIRCUIT FOR PROVIDING A SHORT SIGNAL TRANSIT TIME AS AN INTEGRATED ELEMENT

[72] Inventor: Friedrich-Karl Kroos, Soecking, Germany

[73] Assignee: Siemens Aktiengesellschaft, Berlin and Munich, Germany

[22] Filed: July 7, 1970

[21] Appl. No.: 52,837

[30] Foreign Application Priority Data

July 11, 1969 Germany..........P 19 35 356.1

[52] U.S. Cl.....................307/218, 307/292, 307/215

[51] Int. Cl...............................................H03k 19/22

[58] Field of Search......307/203, 207, 211, 213, 214, 307/215, 16, 217, 218; 328/92, 93, 94, 159; 235/172, 174, 175, 176

[56] References Cited

UNITED STATES PATENTS

| | | | |
|---|---|---|---|
| 3,040,192 | 6/1962 | Slobodzinski | 307/216 |
| 3,404,285 | 10/1968 | Hazlett | 307/218 |
| 3,412,265 | 11/1968 | Cornish | 307/218 |
| 3,413,492 | 11/1968 | Schneider | 307/218 |
| 3,508,076 | 4/1970 | Winder | 307/213 |
| 3,519,810 | 7/1970 | Priel et al. | 307/216 |
| 3,528,017 | 9/1970 | Zussman | 307/218 |
| 3,535,546 | 10/1970 | Davis | 307/218 |
| 3,539,824 | 12/1970 | Yu et al. | 307/218 |
| 3,548,221 | 12/1970 | Hintz | 307/292 |
| 3,539,831 | 11/1970 | Gilbert | 328/150 |

*Primary Examiner*—Donald D. Forrer
*Assistant Examiner*—R. E. Hart
*Attorney*—Hill, Sherman, Meroni, Gross & Simpson

[57] ABSTRACT

A logic circuit to reduce the transit time of a signal and to make the circuit more easily subject to integration as a single element. The logic circuit includes two logic partial circuits, each having two current switches. The partial circuits are coupled to the bases of two emitter follower transistors with the emitters of the two transistors coupled to a joint gate resistance and to an outlet clamp. The first partial circuit forms an AND linkage and the coupling of the two partial circuits of an additional transistor which is connected in parallel with one of the current switches of the second partial circuit forms an OR gate.

1 Claim, 1 Drawing Figure

Patented Aug. 22, 1972 3,686,512
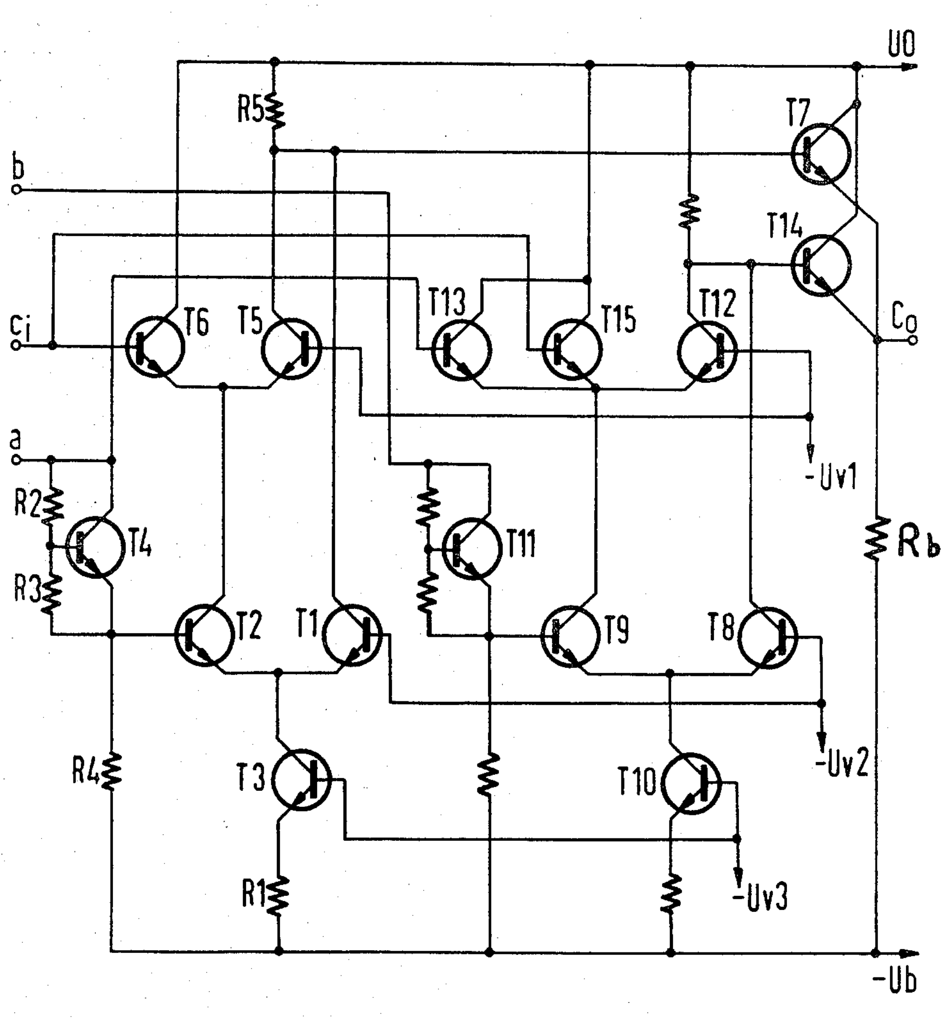
INVENTOR
Friedrich-Karl Kroos
BY Hill, Sherman, Meroni, Gross & Simpson ATTYS.

LOGIC CIRCUIT FOR PROVIDING A SHORT SIGNAL TRANSIT TIME AS AN INTEGRATED ELEMENT

BACKGROUND OF THE INVENTION

Field of the Invention

The field of art to which this invention pertains is logic circuits and particularly to logic circuits having short signal transit times and which are adapted to forming integrated circuit structures.

SUMMARY OF THE INVENTION

It is a principal feature of the present invention to form an improved logic circuit.

It is another feature of the invention to provide a logic circuit with short signal transit times.

It is a principal object of this invention to provide a logic circuit which is readily adapted to integration as a single construction element.

It is another object of the invention to provide a circuit having two logic partial circuits coupled to the bases of a pair of emitter follower transistors respectively wherein the emitters of the transistors are coupled together at a joint gate and to an output clamp for the circuit.

DESCRIPTION OF THE DRAWING

The single drawing in this application is a schematic of the logic circuit of the present invention.

DESCRIPTION OF THE PREFERRED EMBODIMENT

This invention relates to an adder circuit with a particularly short signal transit time.

The desire to increase the speed of operation in data processing and similar systems has led to a demand for a shorter signal transit time in logic circuits. The signal transit time over a simple OR-NOR gate will determine the signal transit time over a complex logic network.

Two possibilities are available to decrease the entire signal transit time.

One of these possibilities consists of applying a circuit technique using as low a gate transit time as possible. Heretofore this ECL circuit technique (emitter-coupled technique) was known in which the conduction of transistors into the region of saturation is prevented. The basic element of the ECL technique is an emitter-coupled differential amplifier with two transistors, the emitters of which are coupled together to a source of substantially constant current. The base of one of the two transistors, referred to herein as the indirectly controlled transistor, is coupled to a fixed auxiliary potential which is selected in a way that it is the arithmetic means of the two signal potentials of the binary control signal which is coupled to the base of the other transistor. The second transistor is referred to herein as the directly controlled transistor. To form an OR linkage the collector-emitter paths of further directly controlled transistors may be connected in parallel to the collector emitter path of this transistor.

The second possibility for shortening the signal transit time over a complex logic network is a reduction in the number of gates which are connected one behind the other. This includes the substitution of real gates by means of wired gate functions which themselves do not contribute to the transit time. This means providing a direct galvanic connection of suitably constructed gate outlets for further AND or OR linkages of the outlet signals (see *Der Elektroniker*, March 1967, page 87). It is also known under the name of "series coupling," to insert further emitter coupled current switches into the collector circuits of the transistors of an emitter coupled current switch (see *Der Elektroniker*, November 1967, pages 56 through 60), which increases the linkage value of the gate without an essentially longer signal transit time. Additional logic linkages may be achieved if transistors which belong to different current switches function with a joint collector resistance. If, for instance, a circuit arrangement is used which has a further current switch inserted only into the collector circuit of the directly controlled transistor, and the collectors of the indirectly controlled transistors of both current switches are connected with each other and with a joint collector resistance, there will result an output signal at the connection point which corresponds to the AND linkage of the input signals. (Data Sheet MC 1.19,1219 of the Motorola Semiconductor Products Inc., Issue November 1967).

To adapt the potentials of the control signal of the "lower" current switch to the potentials of the remaining inlet and outlet signals, it is known to arrange a resistance transistor network ahead of the base of the directly controlled transistor.

Digital circuits are more often being produced as integrated construction elements. Therefore, in addition to the demand for shorter signal transit times there is also the demand for circuits which are easier to integrate. This requires providing as few connection terminals as possible and a low current intake for circuit elements. The demand for few connection terminals means that the signals to be linked are only to be required in one form, normal or inverted.

A circuit arrangement in ECL technique has already been proposed which fulfills the function of the sum outlet of a full adder and complies with the above requirements.

This invention provides a circuit arrangement for the formation of a carry signal in a full adder which represents an addition to the arrangement which has been proposed for the formation of the sum, and which also fulfills the same tasks. If series coupling is used, it should be limited to two stage arrangements for reasons of tolerance.

The circuit arrangement according to the invention has a first logic partial circuit which is constructed according to the prior art of two emitter-coupled series connected current switches for the AND linkage of a signal *a* which corresponds to the first term of a sum and the signal $c_i$ which is formed by means of the addition of the next lower binary point. The circuit also has a second logic partial circuit which itself is essentially constructed in the same manner.

The circuit arrangement which is shown in the drawing, according to this invention, consists of two nearly equal parts. The first circuit part has a first emitter-coupled current switch including the transistors T1 and T2. The emitters of T1 and T2 are coupled to an impressed current source which includes the transistor T3 and the resistance R1. The base of the indirectly controlled transistor T1 is coupled to a fixed auxiliary potential $-Uv2$. The base of the directly controlled transistor T2 is coupled to an inlet terminal *a* for a signal *a* which corresponds to the first term of a sum. A resistance transistor network is coupled between the terminal *a* and the base of T2 to shift the level of the potential of the control signal by about 1.5V. This network includes three resistances R2, R3, R4 coupled between the inlet terminal *a* and the negative supply potential $-Ub$ and further includes the transistor T4, which has its collector coupled to the inlet terminal *a*, its base coupled to the connection point of the resistances R2 and R3 and its emitter coupled to the connection point of the resistances R3 and R4. The emitter of T4 is also coupled to the base of the transistor T2.

A second current switch including the transistors T5 and T6 is inserted into the collector circuit of the directly controlled transistor T2 of the first current switch. The second current switch is controlled by signal $c_i$ which is formed by the addition of the next lower binary point. The collectors of the indirectly controlled transistors T1 and T5 are connected to the base of a transistor T7 which is operated as an emitter follower. Joint collector resistance R5 is coupled from a reference potential UO to the collector T5. The collector of the directly controlled transistor T6 of the "upper" current switch is coupled directly to the reference potential.

The connection point of the collectors of the two indirectly controlled transistors T1 and T5 is coupled to the base of the transistor T7. T7 only carries a (positive) "1" signal, if a (positive) "1" signal is coupled to the inlet terminals a and $c_i$. This is the AND linkage.

The second part of the circuit arrangement as shown in the drawing is substantially similar to the above described first part. The transistors T8 through T14 of the second part correspond to the transistors T1 through T7 of the first part, respectively. The only difference is an additional transistor T15 coupled in parallel with the collector emitter path of the directly controlled transistor T13. Although possible, the parallel switching of the transistor T15 to the transistor T9 would be less advantageous, since an additional resistance transistor network would become necessary to shift the potential level of the control signals. The resistor R6 is connected to output terminal $C_0$ and a negative supply voltage $-Ub$.

If according to the drawing, the inlet signals *a* and $c_i$ are coupled to the bases of the directly controlled transistors T13 and T15 respectively, and (via the potential shifting network) the signal *b* is coupled to the base of the directly controlled transistor T9, there will result the logic linkage $b\,(a+c_i)=ab+bc_i$, at the base of the transistor T14.

The result of the logic coupling of the two partial circuits to the outlet terminal $C_o$ by means of a wired OR function is the relation $C_o = ab + ac_i + bc_i$. The wired OR function is effected by means of the direct connection of the emitters of the two outlet transistors T7 and T14 with the joint outlet terminal $C_o$.

The circuit arrangement for forming the transmission signal does not only have the advantage of a lower signal transit time, but it also requires a minimum number of connection terminals, thus allowing relatively large tolerances due to the series coupling of the two stages, and absorbs only little current, since it has only two emitter-coupled current switches in the lower plane.

Due to the low current consumption and the low number of needed connection terminals, it is possible to accommodate two independent adder circuits in one 14-pole integrated construction member. Voltage dividers or rather control circuits may be used to produce the fixed auxiliary potentials $-Uv1$ (about $-1.2$V), $-Uv2$ (about $-2.4$V) and $-Uv3$ (about $-3$V).

I claim as my invention:

1. A circuit arrangement in emitter-coupled logic technology for the formation of a signal in a full adder with short transit time comprising:

- a first partial logic circuit having two emitter-coupled series connected current switches comprising first, second, third and fourth transistors with the emitters of the first and second transistors connected together and to the collector of said third transistor and the emitters of the third and fourth transistors connected together and the collectors of said second and fourth transistors connected together;
- a second partial logic circuit having two emitter-coupled current switches comprising, fifth, sixth, seventh and eighth transistors and the emitters of the fifth and sixth transistors connected together and to the collector of said seventh transistor and the emitters of the seventh and eighth transistors connected together, a ninth transistor connected in parallel with the fifth transistor, the bases of said second and sixth transistors connected together;
- 10th and 11th transistors coupled together as emitter followers, the base of the 10th transistor connected to the collectors of the second and fourth transistors, the base of the 11th transistor connected to the collectors of the sixth and eighth transistors;
- a joint gate resistance means with one side connected to the emitters of said 10th and 11th transistor and an output circuit terminal connected to said one side of said joint gate resistance means;
- a constant current source including 12th and 13th transistors with the collector of the 12th transistor connected to the emitters of the third and fourth transistors, the collector of the 13th transistor connected to the emitters of the seventh and eighth transistors, the bases of said 12th and 13th transistors connected together;
- a 14th transistor with its emitter connected to the base of the third transistor and its collector connected to the base of said ninth transistor;
- a first input terminal connected to the collector of the 14th transistor and to the base of the ninth transistor;
- a fifteenth transistor with its emitter connected to the base of the seventh transistor;
- a second input terminal connected to the collector of said 15th transistor;
- a third input terminal connected to the base of the first transistor and to the base of said fifth transistor;
- a first resistor connected between the collector and base of said 14th transistor;
- a second resistor connected between the base and emitter of said 14th transistor;

a third resistor connected between the collector and base of said 15th transistor;
a fourth resistor connected between the base and emitter of said 15th transistor;
a negative supply voltage;
a fifth resistor connected between said negative supply voltage and the base of said third resistor;
a sixth resistor connected between the emitter of said 12th transistor and said negative supply voltage;
a seventh resistor connected between the base of said seventh transistor and said negative supply voltage;
an eighth resistor connected between the emitter of said 13th transistor and said negative supply voltage;
the bases of said fourth and eighth transistors connected together;
a ninth resistor connected between the collectors of said first and second transistors;
a 10th resistor connected between the collectors of said first and sixth transistors; and
the collectors of said first, said fifth, said 10th and said 11th transistors connected together.

* * * * *